United States Patent [19]
Kelsey

[11] Patent Number: 5,147,950
[45] Date of Patent: Sep. 15, 1992

[54] IN-MOLD POLMERIZATION OF CYCLIC OLEFINS WITH BOROHYDRIDE COCATALYST

[75] Inventor: Donald R. Kelsey, Fulshear, Tex.

[73] Assignee: Shell Oil Company, Houston, Tex.

[21] Appl. No.: 742,779

[22] Filed: Aug. 8, 1991

Related U.S. Application Data

[60] Division of Ser. No. 560,261, Jul. 30, 1990, Pat. No. 5,071,812, which is a continuation of Ser. No. 331,560, Mar. 31, 1989, abandoned.

[51] Int. Cl.$^5$ .............................................. C08G 61/08
[52] U.S. Cl. .................................... 526/134; 526/113; 526/131; 526/142; 526/143; 526/283; 526/308; 525/289; 525/290; 264/328.2; 264/328.6
[58] Field of Search ............... 526/131, 134, 113, 283, 526/142, 143, 308; 264/328.2, 328.6

[56] References Cited

U.S. PATENT DOCUMENTS

| | | | |
|---|---|---|---|
| 3,594,357 | 7/1971 | Logothetis | 260/88.2 |
| 3,627,739 | 12/1971 | Devlin et al. | 260/88.2 D |
| 3,901,865 | 8/1975 | Tanaka et al. | 526/134 |
| 4,020,260 | 4/1977 | Shiozaki et al. | 526/237 |
| 4,167,616 | 9/1979 | Bollinger | 526/197 |
| 4,179,550 | 12/1979 | Miijamoto et al. | 526/212 |
| 4,357,449 | 11/1982 | Yi | 526/74 |
| 4,360,628 | 11/1982 | Runavot et al. | 524/508 |
| 4,380,617 | 4/1983 | Minchak et al. | 526/283 |
| 4,395,578 | 7/1983 | Larkin | 585/10 |
| 4,508,842 | 4/1985 | Beran et al. | 502/112 |
| 4,518,753 | 5/1985 | Richards et al. | 526/177 |
| 4,562,172 | 12/1985 | Kang et al. | 502/117 |
| 4,638,092 | 1/1987 | Ritter | 568/1 |
| 4,661,465 | 4/1987 | Fuentes et al. | 502/111 |
| 4,694,054 | 9/1987 | Janowicz | 526/93 |
| 4,696,985 | 9/1987 | Martin | 526/119 |
| 4,727,123 | 2/1988 | Weinert et al. | 526/124 |
| 4,729,976 | 3/1988 | Sjardijn | 502/102 |
| 4,835,230 | 5/1989 | Khasat et al. | 526/283 X |

FOREIGN PATENT DOCUMENTS 0840916  7/1960  United Kingdom ................ 526/134

OTHER PUBLICATIONS

Levisalles et al., *J. Organomet. Chem.*, 87, C7(1975).

*Primary Examiner*—Fred Teskin

[57] ABSTRACT

A catalyst and process for the polymerization of cyclic olefins, such as dicyclopentadiene, are disclosed. The catalyst includes a transition metal compound and a borohydride co-catalyst, with optional boron halide promoter. Polymerization can be carried out in a reaction injection molding process to prepare a thermoset molded article.

14 Claims, No Drawings

IN-MOLD POLMERIZATION OF CYCLIC OLEFINS WITH BOROHYDRIDE COCATALYST

This is a division of application Ser. No. 560,261 filed Jul. 30, 1990, now U.S. Pat. No. 5,071,812, which is a continuation of Ser. No. 331,560, filed Mar. 31, 1989, now abandoned.

BACKGROUND OF THE INVENTION

This invention relates to the polymerization of cyclic olefins. In one embodiment, the invention relates to a catalyst for the reaction injection molding of dicyclopentadiene.

Cyclic olefins are subject to ring-opening metathesis polymerization to produce thermoset polymers having physical properties making them suitable for structural and electronic applications, such as molded car parts and electrical laminates. Such polymerizations are commonly carried out in reaction injection molding (RIM) processes, in which a metathesis catalyst and a monomer are charged to a heated mold, and polymerization of the monomer and forming of the polymer into the desired shape are carried out simultaneously in the mold.

In such RIM processes, it is important that the polymerization reaction occur rapidly and with as complete incorporation of the charged monomers as possible. It has been found in molding polydicyclopentadiene, for example, that the presence of unreacted monomers results in a molded part having a very unpleasant odor and less than optimum physical properties. In commercial RIM processes, it is economically desirable that the process be carried out in as short a cycle time as possible and at mold temperatures at or near room temperature. It is also advantageous to be able to use an impure monomer stream and thus avoid extensive purification of the monomer prior to polymerization.

One metathesis catalyst system which has been successfully used in RIM processes is the combination of a phenol-treated transition metal salt, such as $WOCl_4$ or $WCl_6$, and a co-catalyst such as an aluminum or tin compound. In particular, a phenol-substituted tungsten combined with a tin hydride has been found highly efficient for monomer incorporation into the polymer. This catalyst also is highly active in a relatively impure dicyclopentadiene feed stream.

The use of the aluminum and tin co-catalysts, however, has certain drawbacks. Both co-catalysts require special handling because of toxicity concerns and sensitivity to air and moisture. In addition, tin co-catalysts are quite expensive. It would therefore be desirable to provide a co-catalyst for the polymerization of cyclic olefins which has low sensitivity to air and moisture and relatively low toxicity. It would also be desirable to replace the costly tin component of the catalyst without sacrificing catalyst activity.

It is therefore an object of this invention to provide a catalyst and process for the polymerization of cyclic olefins. In one embodiment, it is an object of the invention to provide a co-catalyst which has relatively low toxicity and is stable in the presence of air and moisture. In a further embodiment, it is an object of the invention to provide a reaction injection molding process.

BRIEF DESCRIPTION OF THE INVENTION

According to the invention, a process and catalyst for the polymerization of cyclic olefins are provided, wherein a cyclic olefin is polymerized in the presence of a catalyst composition comprising (a) a transition metal compound and (b) a borohydride co-catalyst. In a specific embodiment, the invention process involves the use of an aryloxy-substituted tungsten halide or oxyhalide, a borohydride co-catalyst and a boron halide promoter for the reaction injection molding of dicyclopentadiene. The invention catalyst and process enable the rapid polymerization of dicyclopentadiene at relatively low mold temperatures or relatively low levels of the catalyst.

DETAILED DESCRIPTION OF THE INVENTION

The Catalyst

The polymerization catalyst includes a transition metal compound. The transition metal is preferably, because of the high activity of the resulting catalyst for dicyclopentadiene polymerization, molybdenum or tungsten. The transition metal compound (or starting material therefor) is generally in the form of a salt, including such salts as halides, including oxyhalides. Suitable halides include chloride, bromide and fluoride. The transition metal halide is preferably one in which the halide is present in a molar amount of at least three atoms per atom of transition metal. Examples of such transition metal halides include molybdenum oxytetrachloride, molybdenum oxytrichloride, molybdenum trioxyhexachloride, molybdenum trioxypentachloride, molybdenum oxytetrafluoride, tungsten hexachloride, tungsten oxytetrachloride, and tungsten oxytetrabromide. The preferred transistion metal compounds, because of their high activity for dicyclopentadiene polymerization, are tungsten hexachloride, tungsten oxytetrachloride, molybdenum oxytrichloride, and mixtures thereof. The transition metal compound will generally be present in the polymerization reaction mixture in an amount of from about 0.001 to about 0.5, preferably from about 0.002 to about 0.2, most preferably from about 0.02 to about 0.1 mole percent, based on moles of cyclic olefin monomer present.

The transition metal compound preferably includes the reaction product of the above transition metal salt with an alcohol or phenol for solubilization and enhanced activity of the transition metal salt. The solubilizing compound can be, for example, phenol or an aryl- or alkyl-substituted phenol such as o-, m- and p-cresol; 2-, 3- and 4-ethylphenol; 2-, 3- and 4-propylphenol; 2-, 3-and 4-isopropylphenol; 2-, 3- and 4-butylphenol; 2-, 3- and 4-tertbutylphenol; 2-, 3- and 4-phenylphenol; 2,4- and 2,6-diisopropylphenol; 2,4- and 2,6-diisobutylphenol; 2,4- and 2,6-di-tertbutylphenol; 2,6-di-tertbutyl-4-methylphenol; 2,4- and 2,6-diphenylphenyl. The phenol can be a halophenol such as, for example, 2-, 3- and 4-fluorophenol; 2,3-, 2,4-, 2,5-, 2,6-, 3,4- and 3,5-difluorophenol; 2,3,4-, 2,3,5-, 2,3,6-, 3,4,5-, 2,4,5- and 2,4,6-trifluorophenol; 2,3,4,5-, 2,4,5,6-and 2,3,5,6-tetrafluorophenol; pentafluorophenol; and the corresponding bromo- and chlorophenols. The phenol can be a haloalkyl-substituted phenol such as, for example, 3-trifluoromethylphenol, 2-trichloromethylphenol, 4-trifluoromethylphenol, 2-trifluoromethylphenol, 3-chlorodifluoromethylphenol, 3-dichlorofluoromethylphenol and 3-tribromomethylphenol. Suitable alcohols include, for example, ethanol, isopropanol, t-butanol, octadecanol and the like. Mixtures of such alcohols and phenols can also be used.

The phenol will generally be present in the catalyst in an amount of about 1 to about 3 moles per mole of the transition metal, preferably from about 1.5 to about 2.5 moles. The reaction product, or aryloxy-substituted transition metal compound, can be prepared, for example, by contacting, under an oxygen-free inert atmosphere, the alcoholic or phenolic compound and the transition metal compound in an inert organic liquid with mild heat and removal of generated hydrogen halide. Suitable inert organic liquids for the reaction include, for example, cyclopentane, cyclohexane, benzene, toluene, xylene, chlorobenzene and dichlorobenzene. The inert organic liquid is then preferably distilled off under vacuum, and the residue is dissolved in dry, degassed cyclic olefin monomer or other suitable solvent.

The Co-Catalyst

The catalyst includes a borohydride co-catalyst, including those compounds which can be represented by the formula $[Y+][BH_mZ_n]^-$ in which $Y+$ represents an organic or organometallic cationic counterion, Z is a substituent group such as alkyl, cyano, halide and the like, $m>0$ and $m+n=4$. Particularly preferred are borohydrides represented by the formula $[R_3P]_2[M+]BH_4^-$, in which each R is independently selected from $C_{1-20}$, preferably $C_{2-12}$, hydrocarbyl, preferably aryl. Examples of such borohydrides include transition metal-based borohydrides such as bis(triphenylphosphine) copper(I) borohydride and ammonium borohydrides such as bis(triphenylphosphorarylidene)ammonium borohydride. Effectiveness of the borohydride depends to some extent on its solubility in the monomer to be polymerized, and difficultly-soluble borohydrides such as sodium triethyl borohydride, sodium borohydride and tetrabutyl ammonium borohydride are in general not active co-catalysts in non-polar cyclic olefins such as dicyclopentadiene. Preferred co-catalysts, because of their activity in dicyclopentadiene, are those represented by the above formula in which $m=4$, $n=0$ and $Y+$ includes aromatic groups such as triarylphosphine and tetraaryldiphosphine, such as 1,2-bis(diphenylphosphine)ethane, moieties.

The amount of the co-catalyst present in the catalyst composition will vary depending on the specific components present and the reaction conditions. In general, the borohydride co-catalyst will be present in an amount within the range of about 0.5 to about 20 or more, preferably about 1 to about 10, moles per mole of the transition metal compound.

The invention catalyst can optionally include a boron halide promoter, including boron trihalides, boron trihalide complexes and tetrahaloborates. The promoter can be, for example, such boron halides as boron tribromide, boron trifluoride, boron trifluoride diethyl ether complex, boron trifluoride dibutyl ether complex, boron trifluoride ethylamine, tetrafluoroboric acid diethyl ether, methyl boron difluoride, phenyl boron dichloride, triphenylmethyl fluoroborate, ammonium tetrafluoroborate, bis(2-ethyl-1-hexyl)ammonium tetrafluoroborate, boron trichloride dimethylsulfide, boron trifluoride alcohol complexes, and the like. The boron compound will be present in the polymerization reaction mixture in an amount effective to promote polymerization of the cyclic olefin monomer, generally from about 0.01 to about 10 moles, preferably from about 0.05 to about 2 moles, per mole of transition metal. The optimum level will vary depending upon the catalyst and the borohydride, and amounts of boron halide above the optimum may inhibit polymerization. The presently-preferred boron halides, because of their high activity and stability, are boron trifluoride and its ethyl ether and butyl ether complexes.

Catalyst Preparation

The preferred catalyst composition of the invention includes an aryloxy-substituted tungsten or molybdenum oxychloride catalyst, optionally combined with an aryloxy-substituted tungsten hexachloride or molybdenum pentachloride, a borohydride co-catalyst, and a boron trifluoride complex promoter. This catalyst has been found to exhibit high activity in the polymerization of dicyclopentadiene.

The above catalyst composition is preferably prepared by reacting about two moles of a substituted phenol with one mole of tungsten hexachloride or tungsten oxytetrachloride, or mixture thereof, in dry inert solvent such as toluene at a temperature within the range of about 25° to about 95° C. under oxygen-free argon. Hydrogen chloride by-product is swept out of the reaction and the toluene is distilled off under vacuum. The reaction product is conveniently dissolved in dry, degassed dicyclopentadiene or other liquid monomer to be polymerized, to make a solution about 2 to 10 weight percent in bisphenoxy tungsten compound, which can be diluted with additional monomer to achieve the desired concentration of catalyst. The borohydride co-catalyst is generally combined with the transition metal catalyst in the reaction mixture as a solution of the monomer to be polymerized. The boron halide promoter, if used, is generally combined with the transition metal and/or borohydride co-catalyst solution.

Polymerization

The polymerization process of the invention involves contacting one or more cyclic olefin monomers with the transition metal component in the presence of the borohydride co-catalyst. Suitable cyclic olefin monomers and comonomers include those of the norbornene type which can be represented by the structural formulas

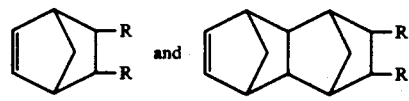

in which each R is selected independently from hydrogen, $C_{1-20}$ alkyl, $C_{1-20}$ alkenyl, aryl and, with R groups linked together through carbon atoms, saturated and unsaturated cyclic hydrocarbon groups. Included in such monomers and comonomers are dicyclopentadiene, norbornene, norbornadiene and 5-(2-propenyl)-norbornene. Commercial cyclic olefins are available at various levels of purity, ranging from about 92 to about 99.9, the upper purity ranges being the result of distillation and further treatment for removal of contaminants and olefins which would be co-polymerized under polymerization conditions. As a general rule, transition metal catalysts employing an alkyl aluminum compound as co-catalyst require a high-purity monomer for acceptable polymerization activity, while the use of a borohydride co-catalyst permits the use of lower purity, technical-grade (83-95%) dicyclopentadiene monomer. An advantage of the invention catalyst is that it is very active in relatively impure (90–95%) dicyclopentadiene.

The invention polymerization process is preferably carried out by reaction injection molding (RIM), in which a solution of the catalyst, preferably in the monomer liquid to be polymerized, is injected into a mold simultaneously with the monomer, in liquid form, to be polymerized. The catalyst is generally employed in a molar ratio of RIM monomer to transition metal (mole:mole) of from about 200:1 to about 12,000:1, preferably about 500:1 to about 8000:1, most preferably about 1000:1 to about 5000:1.

In a preferred RIM polymerization technique, a stream of the transition metal catalyst component in the monomer to be polymerized and a monomer stream containing the borohydride co-catalyst are combined in the mixing head of a RIM machine just prior to injection of the combined stream into a mold. The boron halide promoter, if used, is injected into the mixing head with the transition metal stream, with the co-catalyst stream, or in a separate monomer solution stream.

The initial mold temperature will generally be within the range of about 20° to about 130° C., preferably about 35° to about 100° C. The mold pressure is generally within the range of about 10 to about 50 psi. After injection of the catalyst and monomer into the mold, there is an interval of time, called the "induction time," before onset of a rapid exotherm from the exothermic polymerization reaction. In a commercial RIM process, this induction time should be sufficiently long to permit filling of the mold, typically about 2 minutes, preferably less than thirty seconds. Once the polymerization reaction is initiated, polymerization should occur quite rapidly, usually within about 10 seconds to about 1 minute, and is accompanied by a rapid rise in temperature.

Various optional components can be present in the reaction mixture during polymerization, including solvents, fillers, anti-oxidants, flame retardants, blowing agents, stabilizers, foaming agents, pigments, plasticizers, reinforcing agents and impact modifiers. Particularly preferred is the addition of from about 1 to about 10 weight percent, based on the weight of the monomer, of an elastomer for impact modification of the polymer. These components are most conveniently added to the reaction as constituents of one or more of the reaction mixture streams, as liquids or as solutions in the monomer.

After the polymerization reaction is complete, the molded object may be subjected to an optional post-cure treatment at a temperature in the range of about 100° to about 300° C. for about 1 to 24, preferably about 1 to 2 hours. Such a post-cure treatment can enhance certain polymer properties, including glass transition temperature.

The Polymer

The invention RIM process prepares a crosslinked dicyclopentadiene homopolymer or copolymer. The presently preferred polydicyclopentadiene product is a crosslinked polymer containing at least about 90 percent dicyclopentadiene monomer units. The polymer will typically have a flexural strength of at least about 5000 psi, preferably greater than about 6000 psi, and a Tg of at least about 100° C. (DSC at 20° C./min). The polymer is useful in applications such as structural composites, for example, in the automobile industry, and in electrical applications such as printed circuit boards.

EXAMPLE 1

Polymerization with Tungsten Catalyst and Borohydride Co-Catalyst

Certain specific embodiments of the invention are described in which dicyclopentadiene was polymerized under laboratory-scale reaction injection molding conditions using a tungsten-based catalyst and a borohydride co-catalyst. The aryloxy-substituted tungsten catalyst used in the experimental runs were prepared by reacting tungsten oxytetrachloride with two equivalents or a slight excess of 2,6-diisopropylphenol or 1 to 2 equivalents of 2,6-diphenylphenol in dry toluene at 25°–90° C. under oxygen-free, dry argon and, after the hydrogen chloride by-product had been swept from the reaction, distilling the toluene under vacuum. The residue was dissolved in dry, degassed dicyclopentadiene (about 93% purity containing up to 7% $C_9$ and $C_{10}$ olefins) to make a 5–8 weight percent solution (referred to as catalyst master solution). Described procedures were carried out in a nitrogen dry box or under purified argon atmosphere.

A series of polymerizations of dicyclopentadiene were made using the tungsten oxychloride catalysts and bis(triphenylphosphine)copper(I) borohydride co-catalyst (Aldrich Chemical Company). The conditions and results of each run are shown in Table I. In each run, a 30-mL dried serum bottle with a stir bar was charged with the indicated amount of bis(triphenylphosphine)copper(I) borohydride and about 15 g dry, degassed dicyclopentadiene under nitrogen atmosphere. To the stirred material was added (via syringe) the catalyst master solution containing the tungsten catalyst. The total amount of dicyclopentadiene in each run was 16 g. The contents of the bottle were stirred for about 30 seconds. The bottle, containing a thermocouple, was then transferred to an oil bath at 90° C. Indicated on Table I are time to onset of substantial polymerization of the reaction mass, the internal temperature of the reaction mass at onset, maximum exotherm temperature, and time for the polymerization reaction mass to reach maximum exotherm.

EXAMPLE 2

Polymerization with Bis(Triphenylphosphoranylidene)Ammonium Borohydride Co-Catalyst The polymerization of dicyclopentadiene was conducted essentially as in Run 5 of Example 1 using 0.13 g bis(triphenylphosphoranylidene)ammonium borohydride co-catalyst (Alfa Chemical Company) and boron trifluoride butyl ether complex promoter. The polymerization mixture did not display an exotherm, but set to a hard solid after about 20 minutes in the 90° C. bath.

TABLE 1

| | Bulk Polymerization of Dicyclopentadiene With $(PH_3)_2Cu$ + $BH_4$-Cocatalyst | | | | | | | | |
|---|---|---|---|---|---|---|---|---|---|
| | Cocatalyst | Catalyst | $BF_3^a$ | $BF_3/W$ | Exotherm Onset | | Exotherm Maximum | | |
| Run | (mmol) | (mmol) | (mmol) | Ratio | Time (min) | Temp (°C.) | Time (min) | Temp (°C.) | ΔT |
| | $WOCl_2(2,6\text{-diisopropylphenoxy})_2$ catalyst | | | | | | | | |
| 1 | 0.236 | 0.059 | 0.088 | 1.5 | 4.3 | 84 | 7.3 | 106 | 22 |

TABLE 1-continued

Bulk Polymerization of Dicyclopentadiene With (PH$_3$)$_2$Cu + BH$_4$-Cocatalyst

| Run | Cocatalyst (mmol) | Catalyst (mmol) | BF$_3$[a] (mmol) | BF$_3$/W Ratio | Exotherm Onset Time (min) | Exotherm Onset Temp (°C.) | Exotherm Maximum Time (min) | Exotherm Maximum Temp (°C.) | ΔT |
|---|---|---|---|---|---|---|---|---|---|
| 2 | 0.236 | 0.059 | 0.059 | 1.0 | NE (some gel) | | | | |
| 3 | 0.236 | 0.059 | 0.059 | 1.0 | NE (some gel) | | | | |
| 4 | 0.232 | 0.059 | 0.059 E | 1.0 | NR | | | | |
| 5 | 0.232 | 0.059 | 0.029 E | 0.5 | 2.5 | 69 | 3.1 | 218 | 149 |
| 6 | 0.236 | 0.059 | 0.015 | 0.25 | 5.0 | 97 | 5.4 | 199 | 102 |
| 7 | 0.236 | 0.059 | 0.015 | 0.25 | 6.1 | 94 | 7.3 | 211 | 117 |
| 8 | 0.232 | 0.059 | — | 0 | 11.5 | 97 | 14.3 | 179 | 82 |
| 9 | 0.232 | 0.059 | — | 0 | 10.1 | 105 | 11.3 | 201 | 96 |
| 10 | 0.236 | 0.059 | — | 0 | 6.3 | 106 | 6.9 | 208 | 102 |
| 11 | 0.184 | 0.059 | 0.032 | 0.5 | NR | | | | |
| 12 | 0.184 | 0.059 | 0.015 | 0.25 | NR | | | | |
| 13 | 0.156 | 0.039 | 0.078 | 2.0 | 4.7 | 91 | 7.4 | 110 | 19 |
| 14 | 0.156 | 0.039 | 0.078 | 2.0 | NE (some gel) | | | | |
| 15 | 0.156 | 0.039 | 0.032 | 0.8 | NE (some gel) | | | | |
| 16 | 0.156 | 0.039 | — | 0 | 7.6 | 91 | 12.8 | 96 | 5 |
| 17 | 0.078 | 0.039 | 0.078 | 2.0 | 5.8 | 94 | 6.8 | 99 | 5 |
| WOCl$_x$(2,6-diphenylphenoxy)$_y$ catalyst | | | | | | | | | |
| 18 | 0.364 | 0.067[b] | 0.091 E | 1.3 | 3.0 | 89 | 3.4 | 225 | 136 |
| 19 | 0.232 | 0.053[c] | 0.059 E | 1.1 | 2.8 | 91 | 4.9 | 211 | 120 |

[a] E = ethyl ether complex; all others butyl ether complex
[b] X = 2, Y = 2
[c] Y = 3, Y = 1.
NE = no exotherm
NR = no visible reaction

I claim:

1. A process for in-mold polymerization of a cyclic olefin which comprises
   (a) introducing into a mold a reaction mixture comprising the cyclic olefin, a catalyst comprising an aryloxy-substituted tungsten or molybdenum compound and from about 0.5 to about 20 moles per mole of the transition metal compound of a borohydride which is represented by the formula [R$_3$P]$_2$[M$^+$]BH$_4^-$, in which each R is independently selected from C$_{1-20}$ hydrocarbyl and M$^+$ is selected from copper and ammonium, and
   (b) maintaining the reaction mixture under polymerization conditions for a time sufficient for polymerization of the cyclic olefin and formation of a molded article.

2. The process of claim 1 in which the cyclic olefin comprises dicyclopentadiene.

3. The process of claim 1 in which the borohydride is selected from ammonium borohydrides.

4. The process of claim 2 in which the aryloxy-substituted transition metal compound is a reaction product of at least one of tungsten hexachloride and tungsten oxytetrachloride and a compound selected from the group consisting of halophenols, phenyl-substituted phenols and haloalkyl-substituted phenols.

5. The process of claim 1 in which the aryloxy-substituted transition metal compound is the reaction product of a tungsten or molybdenum salt and an alkyl-substituted phenol and the borohydride is selected from the group consisting of bis(triphenylphosphine)copper (I) borohydride and bis(triphenylphosphorarylidene)ammonium borohydride.

6. The process of claim 1 in which the reaction mixture is introduced into a mold at an initial mold temperature within the range of about 20° to about 130° C.

7. The process of claim 1 in which the reaction mixture is the product of mixing a first stream comprising the aryloxy-substituted transition metal compound and a second stream comprising the borohydride, wherein at least one of said first and second streams further comprises the cyclic olefin monomer.

8. The process of claim 7 in which the borohydride is present in the reaction mixture in an amount within the range of about 1 to about 10 moles per mole of the aryloxy-substituted transition metal compound.

9. The process of claim 7 in which the borohydride is bis(triphenylphosphine)copper(I) borohydride.

10. The process of claim 5 in which the tungsten or molybdenum salt is selected from the group consisting of tungsten hexachloride, tungsten oxytetrachloride and molybdenum oxytrichloride.

11. The process of claim 10 in which the alkyl-substituted phenol is selected from the group consisting of 2,6-diisopropyl phenol and 2,6-diphenylphenol.

12. The process of claim 1 in which the catalyst further comprises a boron halide promoter.

13. The process of claim 12 in which the boron halide promoter is selected from the group consisting of boron tribromide, boron trifluoride ethyl ether complex, boron trifluoride ethylamine and boron trifluoride butyl ether complex.

14. The process of claim 1 in which at least one of the first and second streams further comprises an elastomer.

* * * * *